United States Patent [19]

McCormack

[11] Patent Number: 5,553,456
[45] Date of Patent: Sep. 10, 1996

[54] CLATHRATE FREEZE DESALINATION APPARATUS AND METHOD

[75] Inventor: Richard A. McCormack, La Jolla, Calif.

[73] Assignee: Ramco, Inc., San Diego, Calif.

[21] Appl. No.: 443,384

[22] Filed: May 17, 1995

[51] Int. Cl.$^6$ ............................... B01D 9/04; F25D 3/00
[52] U.S. Cl. ............................... 62/59; 62/532; 62/533; 62/537; 62/123
[58] Field of Search ............................... 62/59, 532, 533, 62/537, 123

[56] References Cited

U.S. PATENT DOCUMENTS

| | | | |
|---|---|---|---|
| 4,297,351 | 6/1980 | Davies | 62/534 X |
| 4,678,583 | 7/1987 | Willison, III et al. | 210/638 |
| 4,686,833 | 8/1987 | Hino et al. | 62/68 |
| 4,696,338 | 9/1987 | Jensen et al. | 165/1 |
| 4,718,242 | 1/1988 | Yamauchi et al. | 62/467 |
| 4,821,794 | 4/1989 | Tsai et al. | 165/104.17 |
| 5,110,479 | 5/1992 | Frommer et al. | 210/662 |
| 5,159,971 | 11/1992 | Li | 62/59 X |
| 5,364,611 | 11/1994 | Fijima et al. | 62/53.1 X |
| 5,444,986 | 8/1995 | Hino | 62/533 X |
| 5,448,892 | 9/1995 | Cheng | 62/532 X |
| 5,473,904 | 12/1995 | Gno et al. | 62/59 X |
| 5,497,630 | 3/1996 | Stein et al. | 62/112 |

OTHER PUBLICATIONS

Vlahakis, John G. et al.,*The Growth Rate of Ice Crystals: The Properties of Carbon Dioxide Hydrate*: A Review of Properties of 51 Gas Hydrates Progress Report No.830, Syracuse, New York, Nov. 1972.
Campbell, R. J. et al.,*Gravity Wash Column Design, Procurement, and Installation*; Followed by Development.
*Tests of the Modified Single–Stage Desalting Pilot Plant At Wrightsville Beach, North Carolina*,AVCO Systems Division, Wilmington, Massachusetts, 1979.
Barduhn, Allen J., "Desalination by Freezing Processes", *Encyclopedia of Chemical Processing and Design*,New York, New York and Basel, Switzerland, 1982.
Burns and Roe Industrial Services Corporation, *Absorption Freezing Vapor Compression*(AFVC) 25,000 gpd, Paramus, New Jersey, Jan. 1982.
Burns and Roe Industrial Services Corporation, *Falling Film Indirect Freezing* –6,000 gpd, Pramus, New Jersey, Jan. 1982.
Wiegandt, Herbert, "Desalination by Freezing", *Desalination Handbook*, Ithaca, New York, Mar. 1990.
Hahn, W. J., *Present Status of the Office of Saline Water Freezing Process Program*, Wrightsville Beach, North Carolina, (not dated).

Primary Examiner—Christopher Kilner
Attorney, Agent, or Firm—Brown, Martin, Haller & McClain

[57] ABSTRACT

A clathrate freeze desalination system and method in which a clathrate forming agent is injected through a submerged pipeline to a predetermined ocean depth at which the surrounding ocean temperature is less than the clathrate forming temperature. The agent combines with the salt water to form a slurry of clathrate ice crystals and brine. The pipeline is concentric and coaxial with a surrounding outer pipeline in which the slurry is formed. The slurry is pumped back to the surface through the outer pipeline and the ice crystals are washed to remove brine. The washed crystals are then melted, and the resultant water is separated from the clathrate forming agent, which may be discarded or recycled for re-injection through the inner pipeline. The melting of the clathrate ice as well as the cold water and air circulating in the desalination plant can be utilized as a source of air conditioning for local buildings and facilities.

22 Claims, 2 Drawing Sheets

CLATHRATE FREEZE DESALINATION APPARATUS AND METHOD

This invention was made with U.S. Government support under the terms of Contract No. 1425-3-CR-81-19520 awarded by the Bureau of Reclamation, United States Department of the Interior. The Government has certain rights in the invention.

BACKGROUND OF THE INVENTION

The present invention relates generally to desalination of seawater, and is particularly concerned with clathrate freeze desalination. It also relates to the combination of clathrate freeze desalination of seawater and air conditioning.

Various techniques have been proposed in the past for obtaining fresh water from seawater, but most of these have been higher cost processes that had limited commercial feasibility. Historically, the original methods proposed for desalinating seawater involved distillation, where seawater is heated to the boiling point and the water vapor released is condensed as fresh water. Later, reverse osmosis, involving the diffusion of fresh water from seawater through a semipermeable membrane, was also developed for use where higher water prices were acceptable. Concurrently, various processes were proposed for desalinating seawater by freezing. These processes, to the extent developed at that time, all proved to be too expensive for commercial use. Some of these processes involved indirect freezing, in which freezing is accomplished by circulating a cold refrigerant through a heat exchanger to remove heat from the seawater. Ice is formed on the heat exchanger surface and must be removed, washed and melted to produce fresh water.

Another category of freeze desalination is by direct freezing, in which heat is removed from seawater by direct contact with a refrigerant, which may be seawater itself, in a vacuum freezing vapor compression process, or alternatively, by use of a secondary refrigerant. In the latter process, a refrigerant (that has a low solubility in water) is compressed, cooled to a temperature close to the freezing temperature of salt water, and mixed with seawater. As the refrigerant evaporates, heat is absorbed from the mixture and the water freezes into ice. Butane is a possible secondary refrigerant for such a process.

Another type of direct freezing desalination process is called gas hydrate or clathrate freeze desalination. This process involves the use of a class of agents that form gas hydrates, or clathrates, with water at temperatures higher than the normal freezing temperature of water. A clathrate is an aggregation of water molecules around a central hydrocarbon, or other non-water molecule, to form an ice crystal. When clathrate "ice" is melted, fresh water and the clathrate forming agent are recovered, thus producing fresh water and regenerating the clathrate forming agent simultaneously. This has an advantage over other direct freezing processes in that the operating temperature is higher, reducing power requirements to both form and melt the "ice." Various alternative proposals for freeze desalination are described in a paper entitled, "Desalination by Freezing" by Herbert Wiegandt, School of Chemical Engineering, Cornell University, March 1990. Several demonstration plants for conducting freeze desalination feasibility and economic testing were designed and constructed by the U.S. Department of the Interior, Office of Saline Water, from 1955 through 1974. However, these were discontinued due to lack of funds and to problems encountered in their operation. In spite of considerable research on clathrate freeze desalination for a number of years, it was not considered to be a commercially viable alternative, due to technical problems and high operating costs. Test plants built for clathrate freeze desalination did not meet design criteria, mainly because the hydrate crystals were very small and both difficult and expensive to separate from the brine.

SUMMARY OF THE INVENTION

It is an object of the present invention to provide a new and improved clathrate freeze desalination apparatus and method. A second object is to utilize the melting of the clathrate ice, the cold brine, and cold water and air from the desalination process to provide air conditioning.

According to one aspect of the present invention, a clathrate freeze desalination apparatus is provided which comprises an outer pipeline of a first diameter, an inner, concentric pipe of smaller diameter than the outer pipeline extending coaxially along at least the majority of its length, the outer pipeline having a first end for submerging in the sea to a predetermined depth below seawater level corresponding to a seawater temperature below a selected clathrate ice forming temperature and a second end for locating above sea level, the inner pipe having a first end adjacent but shorter than the first end of the outer pipeline and a second end, a supply of a clathrate forming agent connected to the second end of the inner pipe and a first pump for pumping the clathrate forming agent through the inner pipe and out of the first end of the inner pipe to form a slurry of clathrate ice and brine at the first end of the outer pipeline, a second pump for pumping the slurry from the first end of the outer pipeline to the second end of the pipeline and into a first wash column and integral clathrate ice separator for washing the brine from the ice crystals and separating the brine from the clathrate ice, the separator having a clathrate ice outlet, a melting unit connected to the clathrate ice outlet for melting the ice to form a mixture of water and clathrate forming agent, and a second set of process separation equipment connected to the melting unit for separating the water from the clathrate forming agent to produce potable water and recover the clathrate forming agent for reuse, and a third pump for pumping the brine back to the ocean.

By injecting the clathrate forming agent at depth at which the seawater temperature is below the clathrate ice forming temperature, no cooling of the seawater is required. The latent heat of fusion to form the clathrate ice can be dissipated during the upward flow of the clathrate ice slurry to the surface. The depth to which the pipe line must be submerged will be dependent on the clathrate forming agent selected. There are a large number of clathrate forming agents that will form clathrate ice at various temperatures and pressures, in both liquid and gaseous form, both as organic and inorganic compounds. Class I clathrate forming agents forms a clathrate ice with five water molecules surrounding a central organic or non-water molecule while Class II clathrate forming agents forms clathrate ice with 17 water molecules surrounding a central organic or non-water molecule. Potentially useful clathrate forming agents for desalination include those listed below according to decomposition temperature with other candidates available for testing for suitability:

|                                      | Critical Decomposition Conditions |                 |
| ------------------------------------ | --------------------------------- | --------------- |
| Agent                                | Temperature (°F.)                 | Pressure (Gage) |
| Carbon Dioxide (CO$_2$)              | 50.0                              | 638             |
| R-141B (CCl$_2$FCH$_3$)              | 52.90                             | 0               |
| R142B (CH$_3$CClF$_2$)               | 55.6                              | 19              |
| R152A (CH$_3$CHF$_2$)                | 58.8                              | 49              |
| Cyclopropane (C$_3$H$_6$)            | 62.6                              | 72              |
| R-22 (CHClF$_2$)                     | 61.3                              | 97              |
| R-31 (CH$_2$ClF)                     | 64.2                              | 27              |
| Methyl Chloride (CH$_3$Cl)           | 68.7                              | 56              |
| Chlorine (Cl$_2$)                    | 82.9                              | 109             |

The above decomposition temperatures are reduced by approximately 4° F. to 6° F. when the clathrate is made with seawater.

In one potential embodiment of the invention, the clathrate forming agent is the halogenated hydrocarbon, HCFC R141B, (dichloromonofluoroethane or CCl$_2$FCH$_3$), which forms a clathrate ice in seawater at approximately 47.5° F. at atmospheric or higher pressure. The seawater temperature at 2,000 feet is typically around 42° F. Thus, by injecting the clathrate forming agent at a depth of 2,000 feet, a 5.5° temperature differential is provided to form the ice. By injecting the clathrate forming agent at this depth, a clathrate ice will be formed. Thus, the outer pipeline has a length of up to 2,000 feet, and will normally be longer than this to accommodate the undersea land contour and an on-shore processing plant. The actual length of the pipeline will be dependent on the distance from the shore at which the ocean floor drops to a depth of up to 2,000 feet, and will therefore vary with the location of the processing plant.

By injecting the clathrate forming agent HCFC R141B at an ocean depth of up to 2,000 feet, clathrate ice crystals will be formed due to the low ocean water temperature at this depth. Clathrate ice is an aggregation of water molecules around a central hydrocarbon or other non-water molecule to form an ice crystal.

For the desalination system of this invention, in which the clathrate forming agent must be injected at ocean depth, it is desirable that the agent is a liquid rather than a gas and that it is a Class II clathrate forming agent. Additionally, the forming agent must be non-toxic, non-flammable, stable, environmentally acceptable, and of relatively low cost for a commercial process. The agent must have a suitable transition temperature, preferably above 47° F., and have a suitable operating pressure in the range of one to seven atmospheres. It is preferable that the agent remain a liquid over the operating temperature range. HCFC R141B, as a potential clathrate forming agent for desalination, has been found to meet all of these criteria.

According to another aspect of the present invention, a clathrate freeze desalination method is provided, which comprises the steps of injecting a clathrate forming agent through the central pipe of a coaxial inner and outer pipeline at an ocean depth at which the temperature of the water is at least several degrees below the clathrate forming temperature for that agent, whereby the forming agent will form a clathrate ice with water molecules in the seawater in the annulus between the outer and inner pipe, pumping the resultant slurry of clathrate ice and brine back up through the outer pipe of the pipeline to a wash column and integral separator, washing the ice crystals and separating the clathrate ice from the brine, melting the clathrate ice to form a mixture of clathrate forming agent and water, and separating the water from the clathrate forming agent.

Preferably, the clathrate forming agent is injected at an ocean depth of up to 2,000 feet, where the ocean temperature and pressure is such that the clathrate ice will be rapidly formed. As the clathrate ice and brine mixture is pumped to the surface for processing, the ice crystals will tumble against each other, tending to scrub salt from the surface of the crystals. The salt will therefore tend to go into solution in the brine water. This minimizes the surface processing needed to separate the brine from the clathrate crystals. Additionally, due to the extended retention time of the crystals in the pipeline at relatively low temperatures, larger crystals will tend to be formed. Crystal size is also increased by the complete latent heat removal due to the coldness of the surrounding seawater over the length of the pipeline in which clathrate formation occurs.

The length of the pipeline where ice crystals form is determined as a function of the latent heat of fusion of the clathrate ice, the logarithmic mean temperature difference between the temperature of fusion and the surrounding seawater, the surface area of the outer pipe, and the thermal conductivity from the surface of the ice crystal, through the seawater in the outer pipe annulus, through the outer pipe wall, and to the seawater surrounding the outer pipe. Where the logarithmic mean temperature difference is small, the length of the pipe will be longer. In some cases it may be desirable to use radial finned pipe, longitudinally finned pipe, headered pipe, and/or other geometrical configurations to reduce the pipe length.

The wall thickness of the outer pipeline may be varied as appropriate to produce increased insulation as the brine and ice crystal mixture travels closer to the surface, where the ocean temperature is higher. The thickness is adjusted such that the crystals will not start to melt before they reach the wash column and separator where the crystals and brine are separated. For the R141B forming agent, the crystals will start to melt at a temperature of 47.5° F. Thus, the pipeline wall thickness will be increased at a depth corresponding to a surrounding ocean temperature of 45° F., thus maintaining a 2.5° margin to insure the ice crystals do not begin to melt before they reach the wash column.

The separated clathrate forming agent may be returned to the supply tank for reuse in subsequent clathrate forming. The separated water may be further purified if necessary to meet potable water standards, and may then be supplied to a storage tank for future use or pumped to a reservoir or municipal water system.

The clathrate freeze desalination system and method of this invention provides a commercially viable technique for efficient and effective seawater desalination. Calculations indicate that such a system may be able to produce potable water at a rate of 3.6 million gallons per day per 48" diameter pipeline, with multiple pipelines increasing the output further, and may reduce the cost of producing fresh water by desalination by a factor of two over current reverse osmosis desalination technology.

The system of this invention is an improvement over previously proposed clathrate freeze desalination systems since it increases the crystal size by approximately a factor, and eliminates the need for a large heat exchanger to remove the latent heat of fusion produced on crystal formation. Instead, the latent heat of fusion is released to the ocean as the crystals are pumped to the surface. This system also eliminates the need for extensive crystal washing, since the crystals will be scrubbed relatively free of salt as they travel to the surface. The system is therefore simpler and requires less and smaller size equipment, than previous proposals for clathrate freeze desalination. It also has considerably reduced power costs, due to the formation of the clathrate at ocean depth, the ocean removal of the heat of fusion of the ice crystals and the ease of melting the clathrate ice at its higher temperature.

According to another aspect of this invention, the latent heat of fusion of the ice crystals, the cold brine water, and the cold air from the air strippers used to separate the fresh water from the clathrate forming agent can be used to provide air conditioning to surrounding buildings and facilities. In many areas desalinated water and air conditioning are both desired, including temperate and tropical islands throughout the world as well as hot arid lands in many parts of the world. In this potential embodiment, air conditioning refrigerants in heat exchangers are used to melt the ice crystals in the ice melter, absorb heat from the brine water discharge lines to the ocean, and absorb heat from the air heater lines between the air stripper and the vapor-phase carbon adsorbers. Heat is absorbed from these cold water and air lines by the refrigerant on the other side of the heat exchanger to provide a desired refrigerant temperature for use in air conditioning buildings and facilities in the local area. This application is particularly appropriate for smaller desalination facilities that serve fresh water and air conditioning to hotel complexes, resorts, commercial complexes, and industrial facilities.

In an alternative method, many of the above advantages of this invention are retained even when a surface heat exchanger is utilized. In this method, the second pump is used to pump the clathrate forming agent and the seawater from the first end of the outer pipeline to the second end of the outer pipeline and into and through a heat exchanger where the clathrate ice crystals are formed and delivered to the first wash column and integral separator, with the remainder of the process being identical. Low temperature seawater from the deep ocean is also pumped through the opposite side of the heat exchanger to remove heat from the deep-ocean water containing the clathrate former to form clathrate ice. The principal disadvantage of this alternate method is that higher pumping costs are encountered.

BRIEF DESCRIPTION OF THE DRAWINGS

The present invention will be better understood from the following detailed description of a preferred embodiment of the invention taken in conjunction with the accompanying drawings, in which like reference numerals refer to like parts, and in which.

DESCRIPTION OF THE EMBODIMENT

Figure 1:
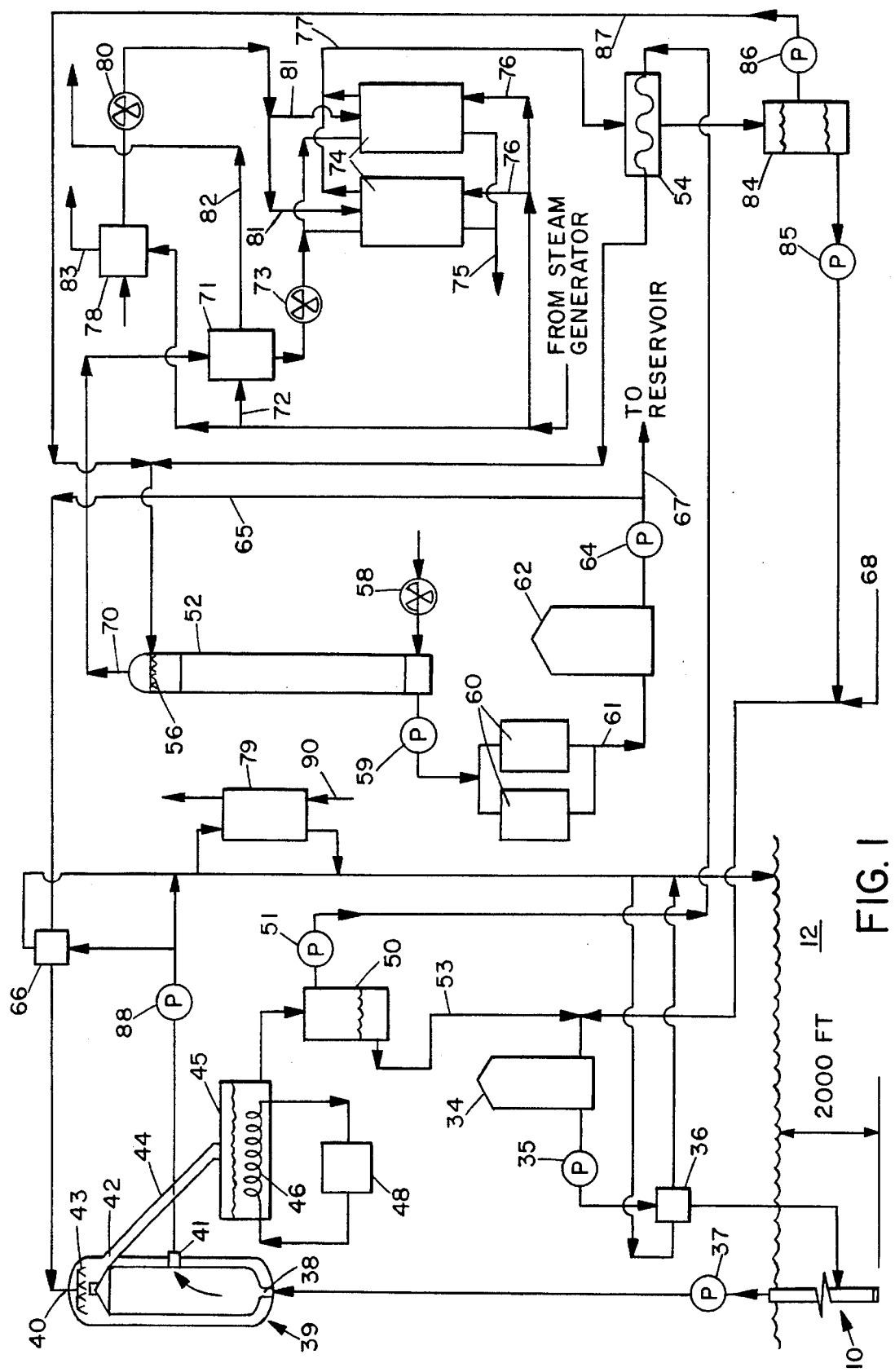
FIG. 1 is a diagram of the desalination system according to a preferred embodiment of the invention, using the HCFC R141B clathrate former as an example for the required process to produce potable water.

FIG. 1 is a block diagram illustrating a clathrate freeze desalination system according to a preferred embodiment of the present invention. The system basically comprises a processing plant located on or adjacent to a body of seawater, and a pipeline 10 extending from the plant which is of sufficient length to extend from the plant and be submerged in the ocean 12 to a depth of up to 2,000 feet below sea level. The diffuser in the pipeline 10 at the submerged end of the pipeline is illustrated in more detail in FIGS. 2 and 3 and comprises an outer pipe 14 of larger diameter and an inner, concentric pipe 15 of smaller diameter extending along at least the majority of the length of the outer pipe to the lower end 16 of the pipeline.

Figure 2:
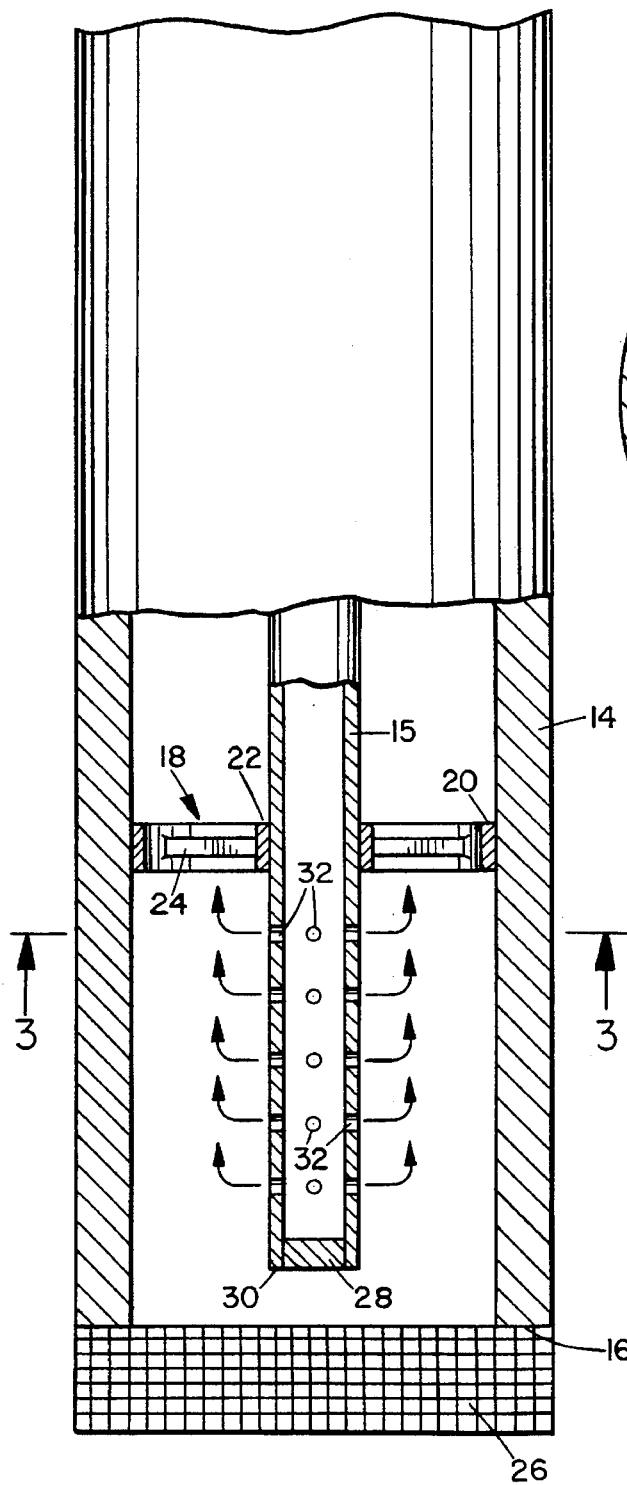
FIG. 2 is a side view, partially cut away, of the lower end of the sub-sea pipeline, typically 48" in diameter.
Figure 3:
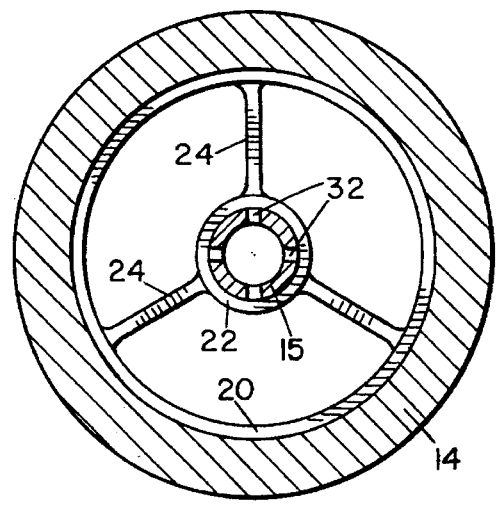
FIG. 3 is a sectional view taken on line 3—3 of FIG. 2.

As illustrated in FIGS. 2 and 3, the inner pipe 15 is aligned coaxially with the outer pipe by means of a series of spaced alignment brackets 18 which are mounted at spaced intervals near the end of pipeline 10. Each alignment bracket comprises an annular outer ring 20 bearing against the inner surface of the outer pipe, an annular inner ring 22 supported around the outer surface of the inner pipe, and radial spacers or arms 24 extending between the inner and outer rings. An inlet filter device 26 is provided across the lower end 16 of the outer pipe, and a plug 28 is secured in the lower end 30 of the inner pipe, which terminates a short distance before the lower end 16 of the outer pipe. The lower end portion on the inner pipe has a series of spaced openings 32 connecting the inner pipe to the outer pipe. The inner and outer pipe are preferably of polyethylene or similar material.

The desalination plant is designed to inject a suitable clathrate forming agent from a storage tank 34 into the inner pipe 15 and pump the agent via pump 35 and cooler 36 to the lower end of the pipeline 10, where it exits the inner pipe 15 via openings 32 and mixes with the cold seawater to form a clathrate ice. The resultant slurry of clathrate ice and brine is pumped by a slurry pump 37 connected to the upper end of pipe 14 from the lower end 16 of the outer pipe along the length of the pipe and into an inlet 38 at the lower end of a wash column 39.

The submerged depth of pipeline 10 will depend on the clathrate forming temperature of the forming agent used and also the deep ocean temperature at the location of the desalination plant. In this embodiment of the invention, a halogenated hydrocarbon is used as the forming agent, for example, HCFC R141B (dichloromonofluoroethane). Although HCFC R141B is the forming agent described in the following example, in practice other suitable non-toxic clathrate forming agents may be used, as listed above. When mixed with salt water, HCFC R141B has been found to have a clathrate forming temperature of around 47.5° F. This particular forming agent is preferably injected to an ocean depth where the seawater temperature is around 42° F. or lower, providing a 5.5° F. or higher temperature differential for forming a clathrate ice. In some areas of the ocean, particularly the sea surrounding the islands of Hawaii, this corresponds to an ocean depth of around 2,000 feet. If a different clathrate forming agent is used, the depth to which the pipeline is submerged will vary depending on the clathrate forming temperature of that agent and the temperature gradient of the ocean at the plant site.

The formation of a clathrate essentially elevates the freezing temperature of water. A clathrate forming temperature between 40° and 85° F. is desirable for a desalination process, to allow use of seawater to form the clathrate crystals. Also, a higher temperature makes melting the clathrate to form fresh water easier. HCFC R141B forms a clathrate ice at around 47.5° F. in salt water at atmospheric or higher pressure with a latent heat of fusion of 137 BTU per pound.

The desalination plant must be located at a site having immediate deep-water ocean access, in other words a location where an ocean depth of 2,000 feet is reasonably close to shore, to reduce the length of pipe needed. The end of the pipeline to be submerged is first floated out to a location where the ocean floor is below 2,000 feet, and submerged in a suitable manner and anchored. Deep sea pipelines up to 48" in diameter are already in use, and such pipelines have been laid by Makai Ocean Engineering, Inc. of Oahu, Hi., for the Natural Energy Laboratory of Hawaii, which provides deep seawater for research and other purposes.

Wash column 39 has an inlet 40 at its upper end for wash water, a series of screened brine outlets 41 around its circumference about half way up the column, and a second, ice outlet 42 adjacent its upper end. The wash column has water spray heads 43 at its upper end. Preferably, the wash column is a vertical, cylindrical tank with an ice scraper and ice paddle (not illustrated) located at the top, and is lined with polyethylene on its inner surface to minimize ice adhering to the walls. The wash column is similar to wash columns used in earlier clathrate freeze desalination test systems, but is reduced in size by a factor of six from these earlier designs. The pump 37 forces the ice slurry to rise up the wash column, while water flows down over the ice. As the ice slurry rises in the wash column, the ice crystals consolidate into a bed. This bed continuously moves up the column as a porous mass. The ice bed will tend to float upward due to the hydraulic pressure in the column, while the brine water moving up from below will tend to deposit ice crystals continuously to the bottom of the bed. At the mid-point of the column, brine water flows out through outlets 41. In the upper half of the wash column, the ice bed is sprayed with fresh water to rinse the film of brine water from the ice. This fresh rinse water trickles down through the ice bed and exits with the brine water via outlets 41.

At the top of the wash column, a rotary ice scraper shaves ⅛" to ¼" thick slices of clean ice from the top of the ice bed, and a paddle pushes the ice to the outlet 42 where the ice drops along chute 44 to an ice melting unit 45.

The ice crystals fall by gravity into the ice melting unit 45 for conversion to a liquid. Unit 45 is a water bath with an array of heating coils 46. A solar steam generator 48 or a heat exchanger connected to a large air conditioning unit (not shown) provides hot water, steam or warm refrigerant from the air conditioning unit for circulation through the heating coils to melt the ice.

The melted ice water and liquid HCFC R141B flow from unit 45 to a decanter 50 for gravity separation. The HCFC R141B is heavier than water and thus sinks to the bottom of the decanter. The decanter is designed to provide a residence time of approximately three hours, depending on the clathrate former selected. The fresh water at the top of the decanter is then pumped via pump 51 to an air stripper tower 52 for recovery of any dissolved HCFC R141B. The HCFC R141B from the bottom of the decanter is pumped back to the storage tank 34 via line 53. From the storage tank, the HCFC R141B is cooled by heat exchanger 36 prior to pumping down to the 2,000 foot depth by pump 35 for reuse in new clathrate ice formation.

The cold fresh water from the decanter 45 is pumped to a steam condenser 54 where it is preheated prior to entering the upper end of fresh water air stripper tower 52 to remove the remaining dissolved HCFC R141B. The concentration of the dissolved HCFC R141B is expected to be approximately 350 parts per million (ppm) as it enters the air stripper. The air stripper is a tall cylindrical fiberglass tower that contains a deep bed of packing. Ambient air is delivered to the bottom of the tower by an air stripper fan 58 and flows up through the packing.

At the top of the tower are a number of spray nozzles 56 that evenly distribute the fresh water over the cross-section of the tower. The fresh water trickles down through the packing that consists of 1.5" diameter polypropane balls. The fresh water flows around these balls forming a thin water film that greatly increases the water surface area exposed to air. The fresh water flows down through the packing while air flows up through the packing, carrying with it water and HCFC R141B vapors that evaporate from the fresh water. The air becomes more and more saturated with volatile vapors as it rises through the column packing. Vaporization of the HCFC R141B is assisted by the increased water surface area of the packing and warmth of the air.

HCFC R141B has a low boiling point of 90° F. and a low solubility in water and hence is easy to remove from the water. The air stripper is designed to remove 99.7% of the HCFC R141B. Based on an inlet concentration of 350 ppm HCFC R141B, the outlet concentration is only one ppm.

The fresh water draining from the bottom of the fresh water air stripper with a residual one ppm concentration of HCFC R141B may require further processing to meet state and federal potable water standards. If so, the water is pumped by pump 59 to a set of liquid-phase carbon adsorbers 60 for removal of the remaining HCFC R141B. As the water entering the liquid-phase carbon adsorbers passes through a bed of carbon particles, the HCFC R141B is adsorbed onto the carbon particles. The fresh water that exhausts through the bottom of the carbon bed will have essentially a zero concentration of any residual HCFC R141B and will thus meet potable water standards.

The minute amounts of HCFC R141B collected in the carbon adsorbers is not recovered since the regeneration of liquid-phase carbon adsorbers is not efficient. There are two carbon adsorbers in parallel, with one unit in service at all times and the other unit maintained in a standby mode. When a carbon unit in service becomes saturated with HCFC R141B, that carbon is replaced with fresh carbon and the saturated carbon is sent off-site for reactivation. During reactivation the carbon is heated to a high temperature in a kiln. The HCFC R141B is driven off as a vapor and disposed in accordance with environmental regulations.

The time duration between replacement of the carbon adsorbers will probably be approximately two to four weeks for a commercial size plant. The time duration between carbon replacements is dependent upon the water throughput, the inlet concentration of HCFC R141B, and the amount of carbon in the adsorber unit. The size and cost of the carbon adsorbers is optimized against the frequency of carbon replacement.

The fresh water at the outlet 61 of adsorbers 60 is connected to a tank 62 for storage. Approximately 10% of the fresh water is pumped by pump 64 along line 65 and through heat exchanger 66 to the wash column for rinsing the brine water from the ice, as described above. The remaining net output of fresh water is then pumped via outlet 67 to a local reservoir or aqueduct for use in municipal water systems.

Due to the cost of the HCFC R141B, it is economical to recover this material for reuse. The recovered HCFC R141B from decanter 50 is supplied to tank 34. HCFC R141B is also recovered from stripper tower 52. A small quantity of makeup HCFC R141B is also supplied to the tank via inlet 68.

The air exiting the outlet 70 at the top of the air stripper will contain HCFC R141B vapors and is at 100% relative humidity since the water evaporates along with the HCFC R141B. The air must be reduced to approximately 50% relative humidity before entering a vapor-phase carbon adsorber 74. The carbon in the adsorbers acts as a desiccant and has difficulty adsorbing the volatile organics at higher humidities.

The air and HCFC R141B vapor mixture from the air stripper is first passed through an air heater 71 to heat the air to approximately 80° F. and to decrease the humidity to approximately 50%. Low pressure steam from the solar steam generator 48 (used to melt the clathrate ice in the ice melter). The warm air is blown by blower or fan 73 through one of two vapor-phase carbon adsorbers 74. The HCFC R141B vapors adsorb onto the carbon particles. The carbon adsorbers have an HCFC R141B removal efficiency of 99%. The air exhausts through the bottom of the carbon bed at outlet 75 to atmosphere essentially void of any residual HCFC R141B.

Two carbon adsorbers are in parallel with one unit in service at all times and the other unit maintained in a fully regenerated standby mode. When the unit in service becomes saturated with HCFC R141B, it is replaced with the fresh unit. Vapor-phase carbon adsorbers, unlike liquid-phase carbon adsorbers, can be regenerated with steam. The saturated unit when in the standby mode is regenerated by passing low pressure saturated steam, 15 pounds per square inch gage, through the carbon bed in reverse flow from steam inlet 76 to outlet 77. As the hot steam flows through the carbon bed, the HCFC R141B vaporizes and is carried with the steam to the condenser 54. During the regeneration cycle, the steam saturates the carbon and the water vapor must be removed. Ambient air is drawn through an air heater 78 by drying air fan 80 and blown into the adsorber at inlet 81 to dry the regenerated carbon unit.

The steam flowing to the two air heaters 71, 78 is also recovered and sent to the condenser 54 via lines 82, 83, respectively. In the condenser the steam and HCFC R141B are condensed and cooled to approximately 70° by the cold water circulating in the tubes. The cold water used in condenser 54 is the fresh water recovered from the decanter 50, as described above.

The steam condensate and liquid HCFC R141B flow to a decanter 84 for gravity separation. The recovered HCFC R141B is pumped by pump 85 to the HCFC R141B storage tank 34. The steam condensate that contains dissolved HCFC R141B is pumped by pump 86 back along line 87 to the air stripper for further processing.

As described above, the brine is separated from the clathrate ice crystals at wash tower 39. The brine is pumped by pump 88 back to the sea. Part of the brine may be circulated through heat exchanger 66 to cool the wash water before returning to sea. It is not considered necessary to remove the HCFC R141B from the brine water due to the insignificant amount of HCFC R141B remaining in the brine at the time it is discharged to sea. The process is designed so that all HCFC R141B injected will form clathrate ice and this ice will not melt until after the brine water is separated in the wash column.

A heat exchanger 79 may be provided in the brine discharge line to the ocean. Air conditioning refrigerant will be supplied via line 90 to the other side of the heat exchanger, and will loose heat before being returned to a building air conditioning system. An air conditioning system may also be connected to the heat exchanger 48 of the ice melter, or in line 72 going to the air heater. This permits the melting of the ice crystals, the cold brine water, and the cold water and air throughout the system to be used beneficially in an air conditioning system.

If more than minute quantities of HCFC R141B remain dissolved in the brine water, this water can be routed to an air stripper (not illustrated). The brine water air stripper, if used, performs like the fresh water air stripper 52 except that it is physically larger to accommodate the larger water throughput. The air stripper is designed to remove 98% of the HCFC R141B. This air would be combined with the air from the fresh water air stripper and routed to the air heater and vapor-phase carbon adsorbers 74 for further recovery.

Based on the inlet concentration of 350 ppm of HCFC R141B, the outlet concentration from the brine water air stripper would be 7 ppm. The brine water air stripper could be designed to remove 99.9% of the HCFC R141B, but this would require a larger tower. The brine water would flow through the drain at the bottom of the tower and by gravity back to the ocean. This minute amount of HCFC R141B in the brine water does not impose an environmental problem since HCFC R141B is not a hazardous material. Any minute amounts of HCFC R141B will continue to evaporate in the ocean.

The brine separated at wash tower 39 will still be at a relatively low temperature and may be circulated through a heat exchanger 79 forming part of an air conditioning system, as described above, for example to provide air conditioning in a district air conditioning system to buildings and other facilities in the local region.

Figure 4:
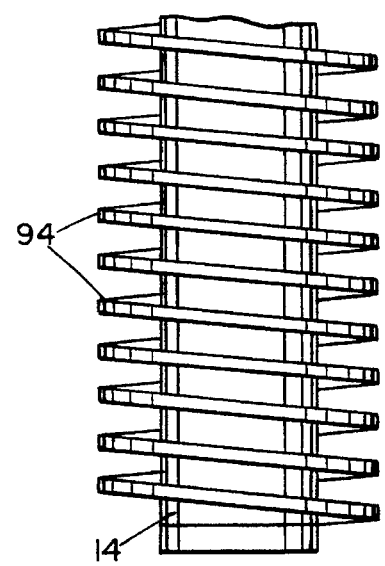
FIG. 4 is a side elevational view of the lower end of a modified pipeline.

Preferably, the outer pipe 14 has a much larger diameter than inner pipe 15. The outer pipe diameter is preferably 48", while the inner pipe 15 may have a diameter of around 6". The larger diameter outer pipeline minimizes the flow pressure drop to approximately 15 feet of hydraulic head. The lower section of the pipeline where the clathrate is forming has a thinner wall section, approximately ½", to dissipate the heat of fusion as the ice forms. The thickness will be the minimum thickness required to maintain rigidity of the pipeline against crimping. In some cases it may be desirable to use radial finned pipe, longitudinally finned pipe, headered pipe, and other geometrical configurations to reduce the pipe length. Thus, the lower section may also have an outwardly projecting, spiral fin 94 for increased heat dissipation, as illustrated in FIG. 4. Preferably, a high density fin design is used, with the fin height on a 48" diameter pipe being 12". This allows the length of the pipe to be reduced, since heat is dissipated faster.

The water surrounding the ice crystals first absorbs the heat of fusion and then begins to increase in temperature. The colder water on the outside of the pipeline will absorb this heat through the pipe wall from the ice slurry to achieve temperature equilibrium. The length of the pipeline where ice crystals form is determined as a function of heat of fusion of the clathrate ice, the logarithmic mean temperature difference between the temperature of fusion and the surrounding seawater, the surface area of the outer pipe, and the thermal conductivity from the surface of the ice crystal, through the seawater in the outer pipe annulus, through the outer pipe wall, and to the seawater surrounding the outer pipe. Where the logarithmic mean temperature difference is small, the length of the pipe will be longer. The ice slurry formed will consist of up to 25% ice crystals which will grow to approximately 400 microns in diameter as the flow moves upward in the pipe. The other 75% will be brine water of increased salinity.

At the appropriate depth, depending on the ocean water temperature, the thickness of the outer pipe wall is increased significantly to provide thermal insulation to prevent the warmer seawater near the surface from melting the ice. The temperature of the HCFC R141B ice slurry should be maintained at 45° F. when it reaches the surface, in other words, 2.5° below the melting point of the crystals. This provides an adequate margin to insure that the ice crystals do not begin to melt before they reach the wash column. When the surrounding seawater reaches a temperature of 45° F., the pipe wall thickness is increased to 2½".

Pipeline 10 is connected to an intake manifold of slurry pump 37 at the shore based desalination plant. Pump 37 is preferably a 350 hp, 14,000 gpm at 30 psig, horizontal, self-priming centrifugal pump. This will be capable of lifting the ice slurry from a 2,000 foot ocean depth. The slurry pump 37 transports the slurry through several 24" polyethylene pipelines to the inlet 38 of wash column 39.

Heat and mass balance requirements for one example of a potential commercial desalination plant of this design using HCFC R141B as the clathrate former are provided on the following page in Table 1.

TABLE 1

HEAT AND MASS BALANCE
Commercial Plant -

| | | Stream no. | | | | | | | |
|---|---|---|---|---|---|---|---|---|---|
| | | 1 | 2 | 3 | 4 | 5 | 6 | 7 | 8 |
| | | | | | | Fluid | | | |
| | | Sea water supply | R141B injection | Brine/ice slurry at surface | Brine/ice slurry to wash col | | Waste brine water to ocean | | |
| Flow rate | gpm | 13,220 | 740 | 13,960 | 13,960 | | 10,720 | | |
| Temperature | F | 42 | 45 | 43 | 44 | | 45 | | |
| Pressure | psia | 880 | 1000 | 40 | 20 | | 20 | | |
| Enthalpy | btu/lb | | | | | | | | |
| Conc R141B | ppm | 0 | | 64,543 | 64,543 | | 0 | | |
| Conc R141B | lb/hr | 0 | 456,432 | 456,432 | 456,432 | | 0 | | |
| Line size | inch dia | | 6" sch 40 | 24" × .738" | 24" × .738" | | 24" × 738" | | |
| Line material | | Poly | C. stl | Poly | Poly | | Poly | | |

| | | Stream no. | | | | | | | |
|---|---|---|---|---|---|---|---|---|---|
| | | 9 | 10 | 11 | 12 | 13 | 14 | 15 | 16 |
| | | | | | | Fluid | | | |
| | | Ice to ice melter | Fresh water & R141B to decanter | R1418 to storage tank | Fresh water to steam condenser | Fresh water & cond to air stripper | Water to carbon adsorber | Fresh water to storage tank | Rinse water to wash col |
| Flow rate | gpm | 3,490 | 3,490 | 739.22 | 2,750 | 2,756 | 2,756 | 2,756 | 250 |
| Temperature | F | 45 | 50 | 50 | 50 | 60 | 60 | 60 | 45 |
| Pressure | psia | 15 | 20 | | 50 | 40 | 30 | | 25 |
| Enthalpy | btu/lb | | | | | | | | |
| Conc R141B | ppm | 240,072 | 249,072 | | 350 | 353 | 1 | 0 | 0 |
| Conc R141b | lb/hr | 456,432 | 456,432 | 455,950 | 482 | 487.0 | 1.4 | 0 | 0 |
| Line size | inch dia | | | 6" | 14" | 14" | 14" | 14" | 4" |
| Line material | | Poly | Poly | Poly | Poly | Poly | Poly | Poly | Poly |

| | | Stream no. | | | | | | | |
|---|---|---|---|---|---|---|---|---|---|
| | | 17 | 18 | 19 | 20 | 21 | 22 | 23 | 24 |
| | | | | | | Fluid | | | |
| | | Fresh water to water sales | Amb air to air stripper | Air/R141B from air stripper | Air/R141B to heater | Air/R141B to carbon adsorber | Air from carbon adsorber | LP steam to carbon adsorber | Steam/ R141B cond to condenser |
| Flow rate | gpm | 2,506 | 24,000 cfm | 24,000 cfm | 24,000 cfm | 24,000 cfm | 24,000 cfm | 3000 pph | 6.97 |
| Temperature | F | | 60 | 50 | 60 | 80 | 80 | 250 | 220 |
| Pressure | psia | | | | | | | 30 | 20 |
| Enthalpy | btu/lb | | | | | | | 1164 | 1131 |
| Conc R141B | ppm | 0 | | 4477 | 4,477 | 4477 | 0 | | 139,330 |
| Conc R141b | lb/hr | 0 | | 485.7 | 485,7 | 485.7 | 0 | | 485.7 |
| Line size | inch dia | 14" | | | | | | | |
| Line material | | | | | | | | C.stl | |

TABLE 1-continued

HEAT AND MASS BALANCE
Commercial Plant -

| | | \multicolumn{8}{c}{Stream no.} | | | | | | | |
|---|---|---|---|---|---|---|---|---|---|
| | | 25 | 26 | 27 | 28 | 29 | 30 | 31 | 32 |
| | | | | | | Fluid | | | |
| | | Steam cond/ R141B to decanter | Steam cond to air stripper | R141B from decanter | Drying air intake | Drying air to carbon adsorber | Steam to ice melter | Condensate return to Solar heater | R141B to cooler |
| Flow rate | gpm | 6.97 | 6.0 | 0.78 | 24,000 cfm | 24,000 cfm | 450 | 450 | 740 |
| Temperature | F | 70 | 70 | 70 | 60 | 140 | 250 | 70 | 70 |
| Pressure | psia | | | | 14.7 | | 30 | 50 | 1000 |
| Enthalpy | btu/lb | 38 | | | | | 1164 | 38 | |
| Conc R141B | ppm | 139,330 | 1800 | | | | | | |
| Conc R141B | lb/hr | 485.7 | 5.40 | 480.3 | | | | | |
| Line size | inches dia | | | | | | | | 6" sch 40 |
| Line material | | | Poly | Poly | | | | | C.stl |

| | | \multicolumn{3}{c}{Stream no.} | |
|---|---|---|---|---|
| | | 33 | 34 | 35 |
| | | | | Fluid |
| | | R141B Makeup | Steam to process air heater | Steam to carbon air dryer |
| Flow rate | gpm | 0.002 | 500 pph | 1000 pph |
| Temperature | F | 60 | 250 | 250 |
| Pressure | psia | | 30 | 30 |
| Enthalpy | btu/lb | | 1164 | 1164 |
| Conc R141B | ppm | | | |
| Conc R141B | lb/hr | 1.38 | | |
| Line size | inches dia | | | |
| Line material | | Poly | C. stl | C.stl |

The fresh water produced by the desalination system and method as described above will be of exceptionally high quality. The total dissolved solids in the water are expected to be less than 100 ppm, which is typical for potable water. The total dissolved solids will be dependent on the effectiveness of the rinse water in washing the crystals in the wash column. The size, shape and structure of the ice crystals will have a strong influence on the effectiveness of the ice wash process. Larger crystals can be washed more easily and efficiently than small crystals. In the method described above, larger crystals will be formed due to the long retention time in the length of the pipeline and latent heat removal by the surrounding seawater over the length of pipe in which crystal formation occurs. By forming the clathrate with salt water, salt will act as the nucleating agent. Laboratory testing has shown that a crystal size of 400 microns may be achieved by the method of this invention. Additionally, the crystals will tend to be scrubbed by the remaining seawater as they travel along the pipeline. Also the ice crystals, since they tumble against one another, tending to scrub off salt from the crystal surfaces. In previously proposed and tested clathrate freeze desalination systems, the maximum crystal size achieved was 40 microns, which was too small to be washed effectively. Earlier designs also required a large heat exchanger and a large amount of power to remove the latent heat of fusion generated in crystal formation, whereas this design uses the surrounding cold ocean water to dissipate this heat.

The need for extensive crystal washing is therefore considerably reduced by this method, both in view of the large crystal size and the scrubbing of the crystals which occurs during transit in the pipeline. In previously proposed systems, the wash column had to be at least six time larger than the wash column of this invention. The system of this invention is simple in design, relatively inexpensive as compared to previous designs, and has an increased yield of fresh water per gallon of water pumped. The fresh water yield may be up to 25% per gallon of pumped seawater. Power consumption required will be of the order of only 6 kilowatt-hours per thousand gallons of fresh water produced.

The clathrate freeze desalination system of this invention therefore has the potential to produce potable water from seawater at competitive costs, and may reduce the cost of fresh water by a factor of two over the best desalination technology developed to date using the reverse osmosis process. The clathrate forming agent can be readily recycled as explained above, further reducing cost.

Although a preferred embodiment of the invention has been described above by way of example only, it will be understood by those skilled in the field that modifications may be made to the disclosed embodiment without departing from the scope of the invention, which is defined by the appended claims.

I claim:

1. Clathrate freeze desalination apparatus, comprising:
   an outer pipeline of predetermined length having a first outer diameter, the outer pipeline having a first, inlet end for submerging under the sea to a depth at which the ocean water is at a predetermined temperature, and a second, outlet end for connecting above the water surface;

a concentric, inner pipe of smaller diameter than the outer pipeline extending within the outer pipeline along at the majority of its length, the inner pipe having an inlet end adjacent the second end of the outer pipeline and an outlet end adjacent the first end of the outer pipeline;

a supply of clathrate forming agent connected to the inlet end of the inner pipe, the clathrate forming agent having a predetermined clathrate forming temperature when mixed with seawater, and the predetermined ocean temperature being lower than said clathrate forming temperature;

first pumping means for pumping said clathrate forming agent from the inlet end to the outlet end of the inner pipe;

second pumping means connected to the outlet end of the outer pipeline for pumping an ice slurry of clathrate ice and brine from the first, submerged end of the outer pipeline to the second end;

a washing unit connected to the second end of the outer pipeline for receiving the ice slurry and washing the brine from the clathrate ice, the washing unit having a first, clathrate ice outlet and a second, brine water outlet;

a melting unit connected to the clathrate ice outlet of the washing unit for receiving the separated, clathrate ice, the melting unit having a heater for melting the clathrate ice, and an outlet; and a separator unit connected to the outlet of the melting unit for separating the melted water from the clathrate forming agent, the unit having a first outlet for the separated water and a second outlet for the clathrate forming agent.

2. The system as claimed in claim 1, wherein the pipeline is submerged to an ocean depth such that the ocean temperature at the submerged end of the pipeline is five or more degrees below the clathrate formation temperature.

3. The system as claimed in claim 2, wherein the clathrate forming temperature is in the range from 40° to 85° F.

4. The system as claimed in claim 1, wherein the clathrate forming agent is selected from the group consisting of carbon dioxide ($CO_2$), R-141B ($CCl_2FCH_3$), R-142B ($CH_3CClF_2$), R-152A ($CH_3CHF_2$), cyclopropane ($C_3H_6$), R-22 ($CHClF_2$), R-31 ($CH_2ClF$), methyl chloride ($CH_3Cl$), and chlorine ($Cl_2$).

5. The system as claimed in claim 4, wherein the clathrate forming agent is a halogenated hydrocarbon which is relatively non-toxic.

6. The system as claimed in claim 5, wherein the halogenated hydrocarbon is HCFC R141B.

7. The system as claimed in claim 1, including a purifying unit connected to the water outlet of the separator unit for separating any residual clathrate forming agent from the water.

8. The system as claimed in claim 7, wherein the purifying unit comprises a decanter and an air stripper tower comprising a vertical column containing a packing material, the tower having an upper end, an outlet for vaporized clathrate forming agent at the upper end, and inlet for water and residual clathrate forming agent at the upper end, an outlet for separated water at the lower end, an inlet for air at the lower end, and a blower for blowing air into the air inlet.

9. The system as claimed in claim 8, including at least one liquid-phase carbon adsorber connected to the outlet of the air stripper tower for removing further residual clathrate forming agent from the water.

10. The system as claimed in claim 8, including a preheater connected between the decanter water outlet and the tower inlet for heating the water and residual clathrate forming agent mixture prior to entering the tower.

11. The system as claimed in claim 7, including a recovery unit connected to the purifying unit for recovering residual clathrate forming agent.

12. The system as claimed in claim 11, wherein the recovery unit comprises at least one vapor-phase carbon adsorber.

13. The system as claimed in claim 1, wherein the second outlet of the decanter is connected to the clathrate forming agent supply for returning separated clathrate forming agent to the supply for recycling.

14. The system as claimed in claim 1, including a pipeline connected to the brine outlet of the washing unit for returning the separated brine water to the ocean.

15. The system as claimed in claim 1, wherein the outer pipeline has a diameter of up to 72" and the inner pipe has a diameter of up to 12".

16. The system as claimed in claim 1, wherein the outer pipeline has a first wall thickness over a portion of its length extending from the first end, and second wall thickness greater than said first wall thickness at a predetermined location in its length up to the second, outlet end, the predetermined location corresponding to a second predetermined ocean temperature.

17. The system as claimed in claim 16, wherein the first wall thickness is 0.50" to 1.5" and the second wall thickness is 2" to 3", whereby the second wall thickness is sufficient to prevent significant heat transfer through the wall thickness as a function of the ocean temperatures near the surface at the system location.

18. The system as claimed in claim 1, wherein the predetermined ocean temperature is at least 5° less than the clathrate forming temperature.

19. The system as claimed in claim 1, including a supply of air conditioning refrigerant from an air conditioning system, and a heat exchanger having a first side connected with the desalination apparatus and a second side connected to the supply of air conditioning refrigerant, and an outlet from the second side of the heat exchanger for returning cooled refrigerant to the air conditioning system, whereby the cold sources in the desalination plant are used to extract heat from the air conditioning refrigerant to provide air conditioning.

20. The system as claimed in claim 1, wherein the pipeline has outwardly projecting, heat dissipating fins extending along at least part of its length from the first, inlet end.

21. A method of desalinating water, comprising the steps of:

injecting a clathrate forming agent through an inner pipe to a predetermined ocean depth at which the ocean temperature is less than the clathrate forming temperature of the agent, whereby the clathrate forming agent forms a slurry of clathrate ice and brine in the surrounding water at the lower end of the pipe;

pumping the slurry back up to the surface through an outer pipeline concentric with the inner pipe while maintaining the temperature of the slurry below the clathrate melting temperature;

supplying the slurry to a washing unit;

washing brine from the ice and returning the brine to the ocean;

melting the ice to form a mixture of water and clathrate forming agent; and separating the water from the clathrate forming agent.

22. A clathrate freeze desalination apparatus, comprising an outer pipeline of predetermined length having a first outer diameter, the outer pipeline having a first, inlet end for submerging under the sea to a depth at which the ocean water is at a predetermined temperature, and a second, outlet end for remaining above the water surface;

a concentric, inner pipe of smaller diameter than the outer pipeline extending coaxially within the outer pipeline along at least the majority of its length, the inner pipe having an inlet end adjacent the second end of the outer pipeline and an outlet end adjacent the first end of the outer pipeline;

a supply of clathrate forming agent connected to the inlet end of the inner pipe end of the inner pipe, the clathrate forming agent having a predetermined clathrate forming temperature when mixed with seawater, and the predetermined ocean temperature being lower than said clathrate forming temperature;

first pumping means for pumping said clathrate forming agent from the inlet end to the outlet end of the inner pipe;

second pumping means connected to the outlet end of the outer pipeline for pumping an ice slurry of clathrate ice and brine from the first, submerged end of the outer pipeline to the second end;

first separating means for separating brine from the ice crystals; and second separating means for melting the ice and separating the melted water from the clathrate forming agent.

* * * * *